United States Patent
Max et al.

(10) Patent No.: US 9,630,556 B2
(45) Date of Patent: Apr. 25, 2017

(54) METHOD AND DEVICE FOR WARNING AGAINST CROSS TRAFFIC WHEN LEAVING A PARKING SPACE

(71) Applicant: VOLKSWAGEN AKTIENGESELLSCHAFT, Wolfsburg (DE)

(72) Inventors: Stephan Max, Gifhorn (DE); Peter Baumann, Braunschweig (DE); Reiner Katzwinkel, Meine (DE)

(73) Assignee: Volkswagen AG, Wolfsburg (DE)

( * ) Notice: Subject to any disclaimer, the term of this patent is extended or adjusted under 35 U.S.C. 154(b) by 54 days.

(21) Appl. No.: 14/442,247

(22) PCT Filed: Nov. 1, 2013

(86) PCT No.: PCT/EP2013/072876
§ 371 (c)(1),
(2) Date: May 12, 2015

(87) PCT Pub. No.: WO2014/075936
PCT Pub. Date: May 22, 2014

(65) Prior Publication Data
US 2016/0272115 A1 Sep. 22, 2016

(30) Foreign Application Priority Data
Nov. 14, 2012 (DE) .................. 10 2012 022 276

(51) Int. Cl.
*B60Q 1/00* (2006.01)
*B60Q 9/00* (2006.01)
(Continued)

(52) U.S. Cl.
CPC ............. *B60Q 9/008* (2013.01); *B60Q 9/006* (2013.01); *G01S 13/87* (2013.01); *G01S 13/931* (2013.01);
(Continued)

(58) Field of Classification Search
CPC ...... B60Q 9/008; G08G 1/16; B60R 2300/80; B60W 2550/00
(Continued)

(56) References Cited

U.S. PATENT DOCUMENTS 8,952,799 B2* 2/2015 Irrgang ............. B60W 30/0956
340/435
9,126,525 B2* 9/2015 Lynam .................. B60Q 9/005
(Continued)

FOREIGN PATENT DOCUMENTS

DE 102009007395 A1 10/2009
DE 102008047284 A1 4/2010
(Continued)

OTHER PUBLICATIONS

Search Report for German Patent Application No. 10 2012 022 276.9; May 6, 2013.
(Continued)

*Primary Examiner* — Phung Nguyen
(74) *Attorney, Agent, or Firm* — Barnes & Thornburg LLP

(57) ABSTRACT

A method for warning the driver of a vehicle against cross traffic when leaving a parking space, wherein the motor vehicle has far-field sensors at least in the region of the rear-end corners for detecting possible cross traffic and lateral near-field sensors for detecting the near surroundings of the vehicle and wherein the warning is generated if at least one of the far-field sensors detects cross traffic. The method surveys the nearby lateral surroundings of the driver's vehicle while leaving the parking space, determines from the results of the near-field detection whether the far-field sensors have a free view of the cross traffic, and generates a notification to the driver if one or both far-field sensors do not have a free view of the cross traffic.

20 Claims, 3 Drawing Sheets

(51) Int. Cl.
  *G01S 13/93* (2006.01)
  *G01S 13/87* (2006.01)
(52) U.S. Cl.
  CPC ............... *G01S 2013/9314* (2013.01); *G01S 2013/9317* (2013.01)
(58) Field of Classification Search
  USPC ............... 340/435, 425.5, 933, 436; 180/271
  See application file for complete search history.

(56) References Cited

U.S. PATENT DOCUMENTS

| | | | | |
|---|---|---|---|---|
| 2007/0279199 | A1* | 12/2007 | Danz | B60Q 9/006 340/435 |
| 2008/0211644 | A1* | 9/2008 | Buckley | B62D 15/027 340/435 |
| 2008/0306666 | A1* | 12/2008 | Zeng | B60Q 9/006 701/70 |
| 2010/0201508 | A1* | 8/2010 | Green | B60Q 9/008 340/435 |
| 2010/0253780 | A1* | 10/2010 | Li | B60R 1/00 348/148 |
| 2010/0329510 | A1* | 12/2010 | Schmid | B62D 15/0275 382/103 |

FOREIGN PATENT DOCUMENTS

| | | |
|---|---|---|
| DE | 102009060165 A1 | 6/2011 |
| DE | 102011016775 A1 | 12/2011 |
| DE | 102011013486 A1 | 4/2012 |
| DE | 102010062350 A1 | 6/2012 |
| EP | 1878615 A1 | 1/2008 |

OTHER PUBLICATIONS

Search Report for International Patent Application No. PCT/EP2013/072876; Dec. 17, 2013.

\* cited by examiner

METHOD AND DEVICE FOR WARNING AGAINST CROSS TRAFFIC WHEN LEAVING A PARKING SPACE

PRIORITY CLAIM

This patent application is a U.S. National Phase of International Patent Application No. PCT/EP2013/072876, filed 1 Nov. 2013, which claims priority to German Patent Application No. 10 2012 022 276.9, filed 14 Nov. 2012, the disclosures of which are incorporated herein by reference in their entirety.

SUMMARY

Illustrative embodiments provide a method for warning against cross traffic when a motor vehicle is leaving a parking space, in particular when a motor vehicle is reversing from a parking space

BACKGROUND

In general, it is difficult for the driver to leave parking spaces and generally drive onto a road in unclear conditions on account of the cross traffic which is always possible. In unfavorable visibility conditions, such as reversing from a perpendicular parking space or driving onto a road from a narrow entrance, it is often the case that the driver must carefully advance into the road region, but this does not necessarily reduce a possible risk of collision.

To assist the driver when driving onto a road in unclear conditions, environment monitoring systems having long-range sensors are known, the long-range sensors being arranged in the region of the vehicle corners in such a manner that they can detect cross traffic in good time when the vehicle is driving onto a road. Radar or lidar sensors are usually used as long-range sensors, but video cameras have also been used in the meantime.

Therefore, the disclosed embodiments provide a method and a device for warning against cross traffic when a vehicle is leaving a perpendicular parking space, which method and device continuously inform the driver of the environmental situation during the operation of leaving the parking space.

BRIEF DESCRIPTION OF THE DRAWINGS

A disclosed embodiment is explained below using the drawings, in which.

DETAILED DESCRIPTION OF THE DISCLOSED EMBODIMENTS

Figure 1:
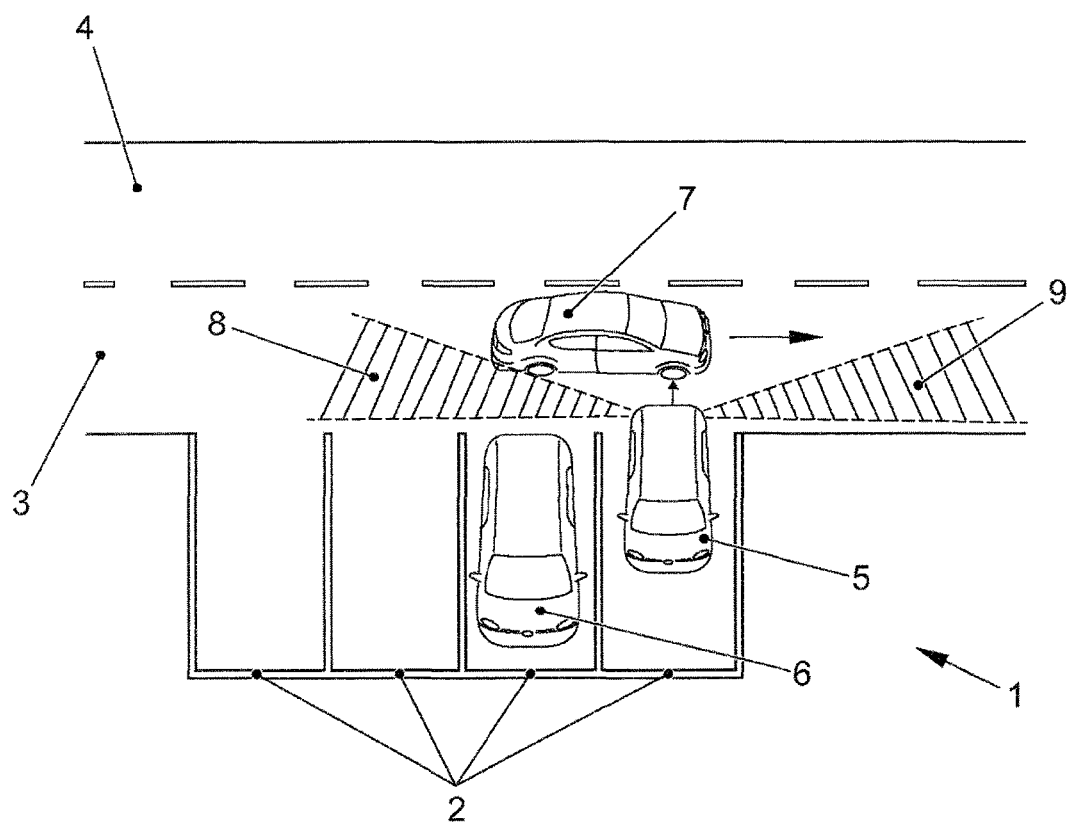
FIG. 1 shows a typical situation when leaving a perpendicular parking space.

The method for warning a driver of a first-party vehicle against cross traffic when leaving a parking space, in particular when reversing from a perpendicular parking space, the motor vehicle having, at least in the region of the rear corners, long-range sensors for detecting possible cross traffic and lateral short-range sensors for detecting the nearby vehicle environment, and a warning being generated if at least one of the long-range sensors detects cross traffic, has the following steps:

the nearby lateral environment of the first-party vehicle is measured when leaving a parking space, the results from the short-range detection are used to determine whether the long-range sensors have a clear view of the cross traffic, and an indication is generated for the driver if one or both long-range sensor(s) do(es) not have a clear view of the cross traffic.

If the vehicle is equipped with long-range sensors on all four corners of the vehicle, only those long-range sensors in the direction of travel of the vehicle may be considered. These are the rear sensors when reversing from a parking space and the front sensors when leaving a parking space in the forward direction, operations of leaving perpendicular parking spaces being considered, in particular.

Long-range sensors are, for example, radar sensors, lidar sensors or video sensors. Ultrasonic sensors, as are used in parking and steering assistants for example, are usually used as short-range sensors.

The driver may find out from the indication that a long-range sensor, and in particular which long-range sensor, does not have a clear view of the cross traffic, that is to say is blocked.

The indication of long-range sensors without a clear view, that is to say blocked sensors, may be optically presented in a display.

Optionally, a representation of the first-party vehicle and its nearby environment is generated in the display, in which case it is optically clear from the representation which long-range sensor does not have a clear view of the cross traffic. One blocked long-range sensor or else both blocked long-range sensors can therefore be represented as an indication.

Optionally, the distances to obstacles determined from the short-range detection are entered in an environment map and the environment map is evaluated in the region of the assumed visual contact between the long-range sensors and possible cross traffic. In this case, the likelihood of when there is visual contact of a blocked long-range sensor may be calculated.

Optionally, the indication of blocked visual contact is formed by a symbol, in particular by a colored bar, which is inserted in the representation of the vehicle environment in the region of the blocked long-range sensor.

Optionally, the indication is removed when the visual blocking of the long-range sensor is removed.

In particular, both the blocked long-range sensors and the long-range sensors having visual contact are represented in the display. In this manner, the driver is always informed of the state of his assistance system and can adapt his driving behavior accordingly.

The device for carrying out the method described above has long-range sensors for detecting possible cross traffic at least in the region of the rear corners of a motor vehicle, lateral short-range sensors for sensing the nearby motor vehicle environment, a warning device for warning against cross traffic, and a display which displays which long-range sensor does not have visual contact with the cross traffic.

The device may have an apparatus for generating an environment map from the measurement results from the short-range sensors, the likelihood of a clear view of the long-range sensors being determined from the environment map in the region of the assumed visual contact with possible cross traffic.

FIG. 1 shows a parking lot 1 consisting of a multiplicity of perpendicular parking spaces 2 which are separated from one another by means of markings. In this case, the parking lot 1 extends along a road with the lanes 3, 4. In a perpendicular parking space 2, a vehicle 5 is about to reverse from the perpendicular parking space into the lane 3. In this case, a parked vehicle 6 is arranged in the neighboring parking space on the passenger side, with the result that the driver of the vehicle 5 leaving the parking space does not have a sufficient view of the further vehicle 7 which is in the lane 3 and crosses the planned trajectory for leaving the parking space, with the result that there is a risk of a collision. The radar sensors 8, 9 which are arranged in the rear vehicle corners of the vehicle 5 leaving the parking space and are symbolically illustrated using dashed lines in FIG. 1 are used by the warning device to sense the cross traffic represented by the vehicle 7 and the warning device warns the driver in critical situations, as is illustrated in FIG. 1.

However, if the direct view of the cross traffic and the first-party vehicle 5 is still obscured by the adjacently parked vehicle 6, there is no possible way of detecting the cross traffic since the radar beams cannot penetrate the adjacent vehicle 6. The radar sensors also cannot be used to actually identify the laterally parked vehicle 6. Therefore, there are no possible warnings of crossing vehicles 7 without the driver of the first-party vehicle 5 being able to detect this.

Lateral ultrasonic sensors (not illustrated) arranged in the first-party vehicle, as are present in a parking and steering assistant for example and are used to measure the parking spaces and for the parking operation, can be used to measure the environment of the first-party vehicle 5 and to enter it in an environment map. Therefore, the result of the determination of the nearby environment can be used to inform the driver, by an indication, that the right-hand rear radar 8 does not have a clear field of view on account of being covered by the parked vehicle 6. The driver can accordingly drive carefully on the basis of this indication.

Figure 2:
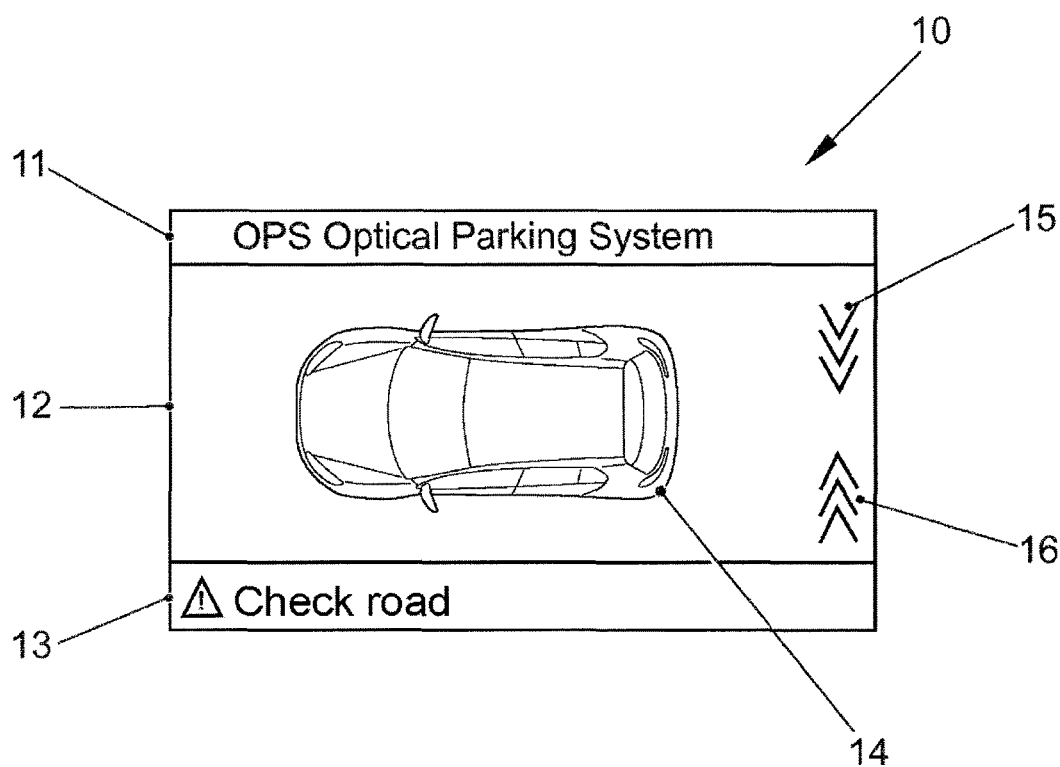
FIG. 2 shows the representation of the vehicle environment including important information in a display.

FIG. 2 shows the representation of the nearby environment of the first-party vehicle 5 from FIG. 1 in a display 10 which has an upper information bar 11, a display region 12 for representing the environment and a lower indication bar 13. The upper information bar 11 displays which assistance function is active. The optical parking system OPS is active in the example in FIG. 2. A symbolic representation 14 of the first-party vehicle 5 from FIG. 1 and its nearby environment can be seen in the display region 12. Since no obstacles are displayed in the nearby environment of the vehicle representation 14, the view of the rear radar sensors 8, 9 from FIG. 1 is clear and this situation is communicated to the driver by the two symbols 15 and 16. In this case, the symbol 15 is intended to symbolize that the right-hand rear radar 8 has a clear view. In a similar manner, the symbol 16 symbolizes the clear view of the left-hand rear radar 9. If there are obstacles in the nearby environment of the first-party vehicle 5 in the vehicle representation 14, these obstacles are symbolically represented in the display region 12.

The display 10 also has a lower indication bar 13 which displays current information for the driver. Since an operation of reversing from a parking space is taking place in the present example, it is indicated to the driver that he should check the road.

Figure 3:
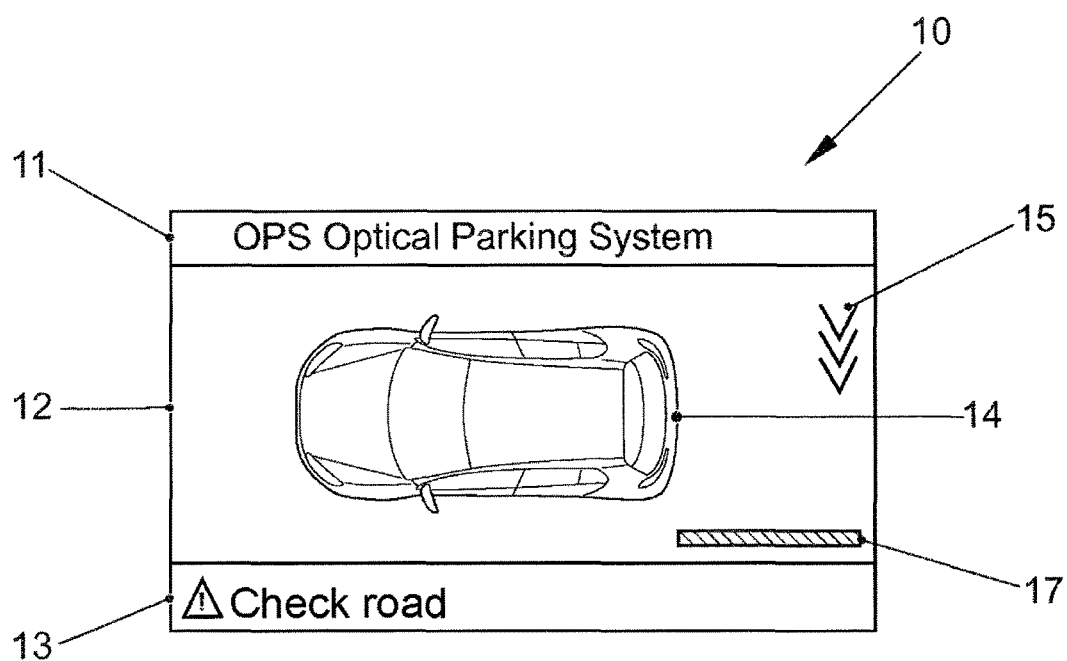
FIG. 3 shows the representation of the vehicle environment when a long-range sensor is blocked by a lateral obstacle.

FIG. 3 shows the situation in which, when the vehicle is reversing from a perpendicular parking space, a vehicle parked in an adjacent parking space or another obstacle, such as a wall, blocks the view of a rear radar 8, 9 of the cross traffic at the beginning of the maneuver of leaving the parking space. The lateral short-range sensors, for example the lateral ultrasonic sensors of a parking and steering assistant, detect obstacles in the nearby environment of the first-party vehicle and enter them in an environment map. A likelihood of a clear view of the radar sensor(s) and therefore the proper functionality thereof is determined by evaluating the environment map in the region of the assumed visual contact with possible cross traffic. For that radar sensor for which no clear view is determined, an indication is inserted in the environment display 12 at the position at which the long-range sensor does not have a clear view. The indication may be effected, for example, by a thick colored bar 17, which indicates the vehicle side on which the rear radar does not have a clear view and therefore no cross traffic can yet be detected at the current vehicle position. In the case illustrated, the left-hand rear radar of the vehicle would not have a clear view. If the first-party vehicle leaving the parking space has moved into a position in which the rear radar has a clear view, the indication symbolized by the bar 17 is switched off again and the symbol 16 for a clear view from FIG. 2 is inserted.

In this manner, the driver is informed of the functionality of the long-range sensors observing the cross traffic, the rear radar sensors in the example, and can accordingly adapt his driving behavior. This possibility also naturally exists during operations of leaving a parking space in the forward direction if the vehicle is equipped with front long-range sensors for the cross traffic.

In general, it is difficult for the driver to leave parking spaces and generally drive onto a road in unclear conditions on account of the cross traffic which is always possible. In unfavorable visibility conditions, such as reversing from a perpendicular parking space or driving onto a road from a narrow entrance, it is often the case that the driver must carefully advance into the road region, but this does not necessarily reduce a possible risk of collision.

To assist the driver when driving onto a road in unclear conditions, environment monitoring systems having long-range sensors are known, the long-range sensors being arranged in the region of the vehicle corners in such a manner that they can detect cross traffic in good time when the vehicle is driving onto a road. Radar or lidar sensors are usually used as long-range sensors, but video cameras have also been used in the meantime.

The document EP 1 878 615 A1 therefore discloses a warning device and a method for monitoring the environment of a vehicle, the warning device having an environment sensor in the region of each vehicle corner of the vehicle. Such an environment sensor comprises a short-range sensor and two long-range sensors. The short-range sensor and one of the two long-range sensors look in the lateral direction in this case with respect to the vehicle longitudinal axis, while the direction of observation of the second long-range sensor points substantially obliquely forward and points obliquely rearward in the case of the rear environment sensors. This arrangement of the long-range sensors makes it possible to determine the cross traffic both when moving forward and when reversing onto a road running substantially perpendicular to the direction of travel. Furthermore, the cross traffic can also be detected when leaving a parallel parking space. The warning device of the vehicle additionally has further short-range sensors arranged on the side of the vehicle. These short-range sensors and the short-range sensors of the environment sensors on the vehicle corners are used to detect the immediate lateral environment of the vehicle. A lateral long-range sensor is therefore activated only when the corresponding short-range sensors have detected that there is no obstacle in the way of the lateral long-range sensor. In other words, if there is an obstacle to the side of the vehicle such as the wall of a gate entrance or a vehicle parked in the neighboring parking space when leaving a perpendicular parking space, the lateral long-range sensor on this side is activated only when the short-range sensors determine a sudden change in the distance to the lateral obstacle, that is to say the viewing direction of the lateral long-range sensor is clear. If the long-range sensor determines cross traffic, that is to say a vehicle laterally approaching on the road, a warning is output to the driver. Alternatively, the warning device may also actuate the brake system of the vehicle and stop the vehicle as a function of the risk potential.

Since the driver does not have any knowledge of when the long-range sensor is activated if a lateral obstacle is present, braking of the vehicle as a possible response to cross traffic may be carried out in a surprising manner for the driver.

The document DE 10 2011 013 486 A1 discloses a driver assistance system having sensors for detecting cross traffic, in which case the likelihood of a collision is calculated when cross traffic is detected and a braking maneuver is initiated when a predefined threshold is exceeded.

The document DE 10 2009 060 165 A1 discloses a method and a device for moving a vehicle from a perpendicular parking space arranged at an angle to the longitudinal direction of the corresponding road, short-range sensors of the vehicle acquiring environment information relating to lateral regions of the vehicle and being used for lateral steering of the vehicle.

The document DE 10 2008 047 284 A1 describes a driver assistance device for assisting a driver when leaving a parallel parking space, the cross traffic on the lateral roads being observed using long-range sensors.

LIST OF REFERENCE SYMBOLS

1 Parking row
2 Perpendicular parking space
3 Lane
4 Lane
5 First-party vehicle
6 Parked vehicle
7 Crossing vehicle
8 Rear radar
9 Rear radar
10 Display
11 Information bar
12 Display region for environment representation
13 Indication bar
14 Representation of vehicle and environment
15 Activity of right-hand rear radar
16 Activity of left-hand rear radar
17 Symbol for interruption in visual contact

The invention claimed is:

1. A method for warning a driver of a motor vehicle against cross traffic when leaving a parking space, the motor vehicle having, at least in a region of rear vehicle corners, long-range sensors for detecting possible cross traffic and lateral short-range sensors for detecting a nearby vehicle environment, the method comprising:
   measuring a nearby lateral environment of the motor vehicle using the short-range sensors to generate a short range-detection when the motor vehicle is leaving the parking space;
   entering measurements of the nearby lateral environment into an environment map;
   detecting possible cross traffic using the long-range sensors; and
   generating a warning in response to at least one of the long-range sensors detecting cross traffic,
   using the environmental map to determine whether the long-range sensors have a clear view of the cross traffic, and generating an indication for the driver in response to one or both long-range sensor(s) not having the clear view of the cross traffic.

2. The method of claim 1, wherein the driver is informed of which long-range sensor does not have the clear view of the cross traffic.

3. The method of claim 1, wherein the indication of long-range sensors without a clear view is optically presented in a display.

4. The method of claim 3, wherein the display generates a representation of the motor vehicle and its nearby environment such that it is optically represented which long-range sensor does not have the clear view of the cross traffic.

5. The method of claim 3, wherein the indication of blocked visual contact is effected by a symbol which is inserted in the representation of the vehicle environment in the region of the blocked long-range sensor.

6. The method of claim 5, wherein the indication is removed from the display when the visual blocking of the long-range sensor is removed.

7. The method of claim 3, wherein both the blocked long-range sensors and the long-range sensors having visual contact are represented in the display.

8. The method of claim 1, further comprising determining and entering distances to obstacles from the short-range detection in the environment map and evaluating the environment map in the region of the assumed visual contact between the long-range sensors and possible cross traffic.

9. The method of claim 8, further comprising the likelihood of when there is visual contact of a blocked long-range sensor is calculated.

10. The method of claim 1, wherein the method is performed when the motor vehicle leaves the parking space by reversing from the parking space.

11. A device for warning a driver of a motor vehicle against cross traffic when leaving a parking space, the device comprising:
   long-range sensors which are arranged at least in a region of rear corners of the motor vehicle and configured to detect possible cross traffic;
   lateral short-range sensors for sensing a nearby motor vehicle environment, wherein the short-range sensors are configured to measure a nearby lateral environment of the motor vehicle to generate a short range-detection when the motor vehicle is leaving the parking space,
   an environment map into which the measurements of the nearby lateral environment are entered;
   a warning device for warning against cross traffic;
   wherein the environment map is used to determine whether the long-range sensors have a clear view of the cross traffic, and an indication is generated for the driver in response to one or both long-range sensor(s) not having the clear view of the cross traffic;
   a display which displays the indication of which long-range sensor does not have visual contact with the cross traffic.

12. The device of claim 11, wherein the device has an apparatus for generating the environment map from the measurement results from the short-range sensors, the likelihood of a clear view of the long-range sensors being determined from the environment map in the region of an assumed visual contact with possible cross traffic.

13. The device of claim 11, wherein the driver is informed of which long-range sensor does not have the clear view of the cross traffic.

14. The device of claim 11, wherein the indication of long-range sensors without a clear view is optically presented on the display.

15. The device of claim 14, wherein the indication of blocked visual contact is effected by a symbol which is inserted in the representation of the vehicle environment in the region of the blocked long-range sensor.

16. The device of claim 15, wherein the indication is removed when the visual blocking of the long-range sensor is removed.

17. The device of claim 14, wherein both the blocked long-range sensors and the long-range sensors having visual contact are represented in the display.

18. The device of claim 11, wherein the display generates a representation of the motor vehicle and its nearby environment such that it is optically represented which long-range sensor does not have the clear view of the cross traffic.

19. The device of claim 11, wherein distances to obstacles are determining and from short-range detection in the environment map and the environment map is evaluated in the region of an assumed visual contact between the long-range sensors and possible cross traffic.

20. The device of claim 11, wherein a likelihood of when there is visual contact of a blocked long-range sensor is calculated.

* * * * *